United States Patent
Soga

(10) Patent No.: US 9,950,964 B2
(45) Date of Patent: Apr. 24, 2018

(54) CERAMIC HONEYCOMB STRUCTURE AND ITS PRODUCTION METHOD

(71) Applicant: HITACHI METALS, LTD., Minato-ku, Tokyo (JP)

(72) Inventor: Wataru Soga, Miyako-gun (JP)

(73) Assignee: HITACHI METALS LTD., Tokyo (JP)

( * ) Notice: Subject to any disclaimer, the term of this patent is extended or adjusted under 35 U.S.C. 154(b) by 243 days.

(21) Appl. No.: 14/350,708

(22) PCT Filed: Sep. 21, 2012

(86) PCT No.: PCT/JP2012/074270
§ 371 (c)(1),
(2) Date: Apr. 9, 2014

(87) PCT Pub. No.: WO2013/054651
PCT Pub. Date: Apr. 18, 2013

(65) Prior Publication Data
US 2014/0248464 A1 Sep. 4, 2014

(30) Foreign Application Priority Data

Oct. 11, 2011 (JP) .................................. 2011-224019
Mar. 29, 2012 (JP) .................................. 2012-075616

(51) Int. Cl.
*C04B 38/00* (2006.01)
*B01D 39/20* (2006.01)
(Continued)

(52) U.S. Cl.
CPC .......... *C04B 38/0012* (2013.01); *B01D 39/20* (2013.01); *B01D 46/00* (2013.01);
(Continued)

(58) Field of Classification Search
CPC ............................................. Y10T 428/24157
See application file for complete search history.

(56) References Cited

U.S. PATENT DOCUMENTS 5,219,667 A * 6/1993 Hampton ................. B01J 35/04
29/890
5,629,067 A 5/1997 Kotani et al.
(Continued)

FOREIGN PATENT DOCUMENTS

JP 5-269388 A 10/1993
JP 2003-284923 A 10/2003
(Continued)

*Primary Examiner* — Xiao S Zhao
(74) *Attorney, Agent, or Firm* — Sughrue Mion, PLLC

(57) ABSTRACT

A method for producing a ceramic honeycomb structure comprising a ceramic honeycomb body having large numbers of longitudinal cells partitioned by porous cell walls, and a peripheral wall formed on a peripheral surface of the ceramic honeycomb structure, comprising the steps of extruding a moldable ceramic material to form a honeycomb-structured ceramic green body; machining a peripheral portion of the green body or a sintered body obtained from the green body to remove part of cell walls in the peripheral portion, thereby obtaining the ceramic honeycomb body having longitudinal grooves on the peripheral surface; applying a coating material to the peripheral surface of the ceramic honeycomb body to form the peripheral wall, as well as to peripheral portions of both end surfaces of the ceramic honeycomb body; and inserting the coating material applied to the peripheral portions of both end surfaces into peripheral cells, with partially remaining on the peripheral portions.

1 Claim, 12 Drawing Sheets

(51) Int. Cl.
*B01D 46/00* (2006.01)
*B01J 35/04* (2006.01)
*C04B 41/85* (2006.01)
*C04B 41/00* (2006.01)
*C04B 41/50* (2006.01)
*B01D 46/24* (2006.01)
*B28B 11/00* (2006.01)
*B28B 11/08* (2006.01)
*B28B 19/00* (2006.01)
*C04B 111/00* (2006.01)

(52) U.S. Cl.
CPC ..... *B01D 46/0001* (2013.01); *B01D 46/2462* (2013.01); *B01J 35/04* (2013.01); *B28B 11/006* (2013.01); *B28B 11/0845* (2013.01); *B28B 19/0038* (2013.01); *C04B 38/00* (2013.01); *C04B 38/0006* (2013.01); *C04B 41/009* (2013.01); *C04B 41/5089* (2013.01); *C04B 41/85* (2013.01); *C04B 2111/0081* (2013.01); *Y10T 428/24157* (2015.01)

(56) References Cited

U.S. PATENT DOCUMENTS

| | | |
|---|---|---|
| 7,101,601 B2 | 9/2006 | Ishihara et al. |
| 7,429,285 B2 | 9/2008 | Kuki et al. |
| 7,497,999 B2 | 3/2009 | Ichikawa |
| 8,158,202 B2 | 4/2012 | Ichikawa |
| 8,268,401 B2 | 9/2012 | Tokumaru |
| 2004/0071932 A1 | 4/2004 | Ishihara et al. |
| 2005/0129590 A1 | 6/2005 | Ichikawa |
| 2005/0210848 A1 | 9/2005 | Kuki et al. |
| 2006/0249888 A1 | 11/2006 | Ishihara et al. |
| 2009/0136710 A1 | 5/2009 | Ichikawa |
| 2010/0009117 A1* | 1/2010 | Okazaki ............ B01D 46/2444 428/116 |
| 2010/0086696 A1 | 4/2010 | Tokumaru |

FOREIGN PATENT DOCUMENTS

| | | |
|---|---|---|
| JP | 2004-154768 A | 6/2004 |
| JP | 2005-270755 A | 10/2005 |
| WO | 2007/148764 A1 | 12/2007 |
| WO | 2008/117729 A1 | 10/2008 |

\* cited by examiner

CERAMIC HONEYCOMB STRUCTURE AND ITS PRODUCTION METHOD

CROSS REFERENCE TO RELATED APPLICATIONS

This application is a National Stage of International Application No. PCT/JP2012/074270, filed on Sep. 21, 2012 (which claims priority from Japanese Patent Application Nos. 2011-224019, filed on Oct. 11, 2011, and 2012-075616, filed Mar. 29, 2012), the contents of which are incorporated herein by reference in their entirety.

FIELD OF THE INVENTION

The present invention relates to a method for producing a ceramic honeycomb structure used for cleaning an exhaust gas discharged from internal combustion engines of automobiles, etc., and a ceramic honeycomb structure.

BACKGROUND OF THE INVENTION

To remove toxic materials from exhaust gases discharged from internal combustion engines of automobiles, etc., exhaust-gas-cleaning catalyst converters and particulate-capturing filters constituted by ceramic honeycomb structures are used.

As shown in FIGS. 12(a) and 12(b), a ceramic honeycomb structure 50 comprises a ceramic honeycomb body 51 having large numbers of longitudinal cells 54 partitioned by porous cell walls 53, and a peripheral wall 52 formed on a periphery of the ceramic honeycomb body 51, with a substantially circular or ellipsoidal cross section perpendicular to its flow paths [see FIG. 12(b)]. The ceramic honeycomb structure 50 is assembled in a metal container (not shown), in which it is fixed in a holding member (not shown) formed by a metal mesh or ceramic mat, etc. Accordingly, the peripheral wall should have enough strength to withstand heat shock under a load by the holding member.

JP 05-269388 A discloses, as shown in FIGS. 13(a) and 13(b), a ceramic honeycomb structure 50 comprising a ceramic honeycomb body 51 having large numbers of longitudinal cells 54 partitioned by porous cell walls 53 and longitudinal open grooves 56 on a peripheral surface 51a, and a peripheral wall 52 formed by a coating material filled in the grooves 56. This ceramic honeycomb structure 50 is produced by forming a sintered ceramic honeycomb body integral with a peripheral wall by a known method, removing peripheral cells by grinding to form a ceramic honeycomb body having grooves on the peripheral surface, filling the grooves 56 of the ceramic honeycomb body with a coating material paste 57 comprising ceramic particles and/or ceramic fibers and colloidal silica or colloidal alumina and drying it to form the peripheral wall 52. JP 05-269388 A describes that such method produces a ceramic honeycomb structure having a reinforced peripheral portion, with excellent heat resistance and heat shock resistance.

JP 05-269388 A describes that the coating material 57 filled in the grooves 56 on the periphery was left in the air for 24 hours, and then heated for drying at 90° C. for 2 hours. To improve production efficiency, it is tried to rapidly dry the coating material by a hot-air drying furnace, microwave, etc. However, when introduced into a high-temperature (80° C. or higher) hot-air drying furnace, or when high-power microwave drying starts, extreme temperature difference rapidly occurs between the ceramic honeycomb body 51 and the peripheral wall 52. By thermal stress (heat shock) generated at this time, gaps are formed in a boundary between the grooves 56 of the ceramic honeycomb body 51 and end portions of the peripheral wall 52. In subsequent handling and use in a metal container, gaps in the end portions of the peripheral wall of the ceramic honeycomb structure act as sites, from which the end portions of the peripheral wall are peeled and chipped, resulting in the breakage of the peripheral wall, making the ceramic honeycomb structure unusable.

WO 07/148764 discloses, as shown in FIG. 15(a), a ceramic honeycomb structure 60 comprising a ceramic honeycomb body 61, and a peripheral wall 62 comprising a peripheral coating portion 63 covering a peripheral surface 61a of the ceramic honeycomb body 61, and extensions 64 projecting outward from end surfaces 65a, 65b of the ceramic honeycomb body 61 for covering peripheral portions of the end surfaces 65a, 65b. As shown in FIG. 15(b), the ceramic honeycomb structure 60 described in WO 07/148764 is produced by sandwiching both end surfaces 65a, 65b of the ceramic honeycomb body 61 by two holding members 69a, 69b such that a peripheral portion of at least one end surface 65a, 65b is open, applying a coating material 67 by a scraper 68 to the peripheral surface 61a and peripheral portions of the end surfaces 65a, 65b to form the peripheral coating portion 63 and the extensions 64, and then drying and if necessary, sintering them. WO 07/148764 describes that this method can effectively prevents the breakage and peeling of the peripheral wall 62.

WO 07/148764 describes that to prevent the peripheral coating layer from being cracked by drying, the coating material is preferably dried by a combination of hot-air drying at 100-200° C. and static drying with an electric heater, far-infrared rays, etc.; and that a drying speed is preferably adjusted by moisturizing. However, like the method described in JP 05-269388 A, when the coating material 67 is rapidly dried by a hot-air drying furnace, microwave, etc. to improve production efficiency, drastic temperature difference occurs at the time of entering a high-temperature (80° C. or higher) hot-air drying furnace or starting high-power microwave drying, causing heat shock, which likely generates gaps between end portions 63a of the peripheral coating portion 63 and the peripheral surface 61a, and between the extensions 64 and the end surfaces 65a, 65b. In subsequent handling and use in a metal container, these gaps act as sites, from which the end portions of the peripheral wall are peeled and chipped, resulting in the breakage of the peripheral wall, and thus making the ceramic honeycomb structure 60 unusable.

WO 08/117729 A discloses, as shown in FIG. 16(a), a ceramic honeycomb structure 70 comprising a ceramic honeycomb body 71 having a peripheral wall 73 longitudinally longer than the ceramic honeycomb body 71, and peripheral walls 74 in peripheral portions of end surfaces 75a, 75b of the ceramic honeycomb body 71. WO 08/117729 A describes that the peripheral walls 74 formed in the peripheral portions of the end surfaces are preferably removed from the end surfaces of the ceramic honeycomb body 71 after drying as shown in FIG. 16(b). WO 08/117729 A describes that the ceramic honeycomb structure 70 is produced by drying a coating material 77 applied to a peripheral surface 71a and peripheral portions of the end surfaces 75a, 75b, and that because the peripheral wall 73 is longitudinally longer than the ceramic honeycomb body 71, gaps are not generated in a boundary between the peripheral surface 71a and the coating material 77 by drying, avoiding chipping in the peripheral wall due to shock, etc.

However, like the methods described in JP 05-269388 A and WO 07/148764 A, when the coating material 77 applied to the peripheral surface 71a and the peripheral portions of the end surfaces 75a, 75b in WO 08/117729 A is rapidly dried by a hot-air drying furnace, microwave, etc. to improve production efficiency, gaps are easily generated by heat shock between end portions 73a of the peripheral wall 73 and the peripheral surface 71a, and between the peripheral walls 74 and the end surfaces 75a, 75b. Further, when the peripheral walls 74 formed on the peripheral portions of the end surfaces 75a, 75b are removed from the end surfaces 75a, 75b, gaps between the end portions 73a of the peripheral wall 73 and the peripheral surface 71a are expanded. In subsequent handling and use in a metal container, these gaps act as sites, from which the end portions 73a of the peripheral wall 73 are peeled and chipped, resulting in the breakage of the peripheral wall, and thus making the ceramic honeycomb structure 70 unusable.

JP 2003-284923 A discloses, as shown in FIG. 17, a ceramic honeycomb structure 80 comprising a ceramic honeycomb body 81, in which predetermined numbers of outermost cells and cells inside therefrom are each sealed in at least one end portion and/or an intermediate portion by a peripheral wall 82, to constitute a sealed-cell portion 84 through which a fluid does not flow. JP 2003-284923 A describes that this ceramic honeycomb structure 80 is produced by drying and sintering an extruded honeycomb-structured green body with different shrinkage ratios between both end portions to from a frustoconical ceramic honeycomb body, machining a frustoconical peripheral surface portion of the ceramic honeycomb body to a cylindrical shape, forming the peripheral wall 82 on the peripheral surface 81a, and drying it. JP 2003-284923 A describes that the honeycomb structure 80 produced by this method has a heat insulation function by the sealed-cell portion 84 formed by the peripheral wall 82, enjoying a short temperature-elevating time from the start of operation, so that the activity of a catalyst carried can be enhanced in a short period of time.

However, like the prior art described above, when the peripheral wall 82 on the peripheral surface 81a is rapidly dried by a hot-air drying furnace, microwave, etc. to improve production efficiency, the method described in JP 2003-284923 A suffers the problem of easily generating gaps by heat shock in a boundary between the peripheral surface 81a and the end portions of the peripheral wall 82. In subsequent handling and use in a metal container, these gaps act as sites, from which the end portions of the peripheral wall are peeled and chipped, resulting in the breakage of the peripheral wall, and thus making the ceramic honeycomb structure 80 unusable.

OBJECT OF THE INVENTION

Accordingly, an object of the present invention is to solve the above problems, providing a method for producing a ceramic honeycomb structure comprising the steps of applying a coating material to a peripheral surface of a ceramic honeycomb body, which has longitudinal grooves, to form a peripheral wall, without generating gaps between end portions of the peripheral wall and the grooves on the peripheral surface even under heat shock in drying in a hot air drying furnace, by microwave, etc., and a ceramic honeycomb structure not suffering the peeling of end portions of the peripheral wall, in subsequent handling and use in a metal container.

DISCLOSURE OF THE INVENTION

As a result of intensive research in view of the above object, the inventors have found that in addition to a coating material applied to a peripheral surface of a ceramic honeycomb body, which has longitudinal grooves, to form a peripheral wall, when the coating material is applied to peripheral portions of both end surfaces of the ceramic honeycomb body, and inserted into peripheral cells such that it remains on the peripheral portions of both end surfaces, gaps are not generated between end portions of the peripheral wall and the grooves on the peripheral surface by drying in a hot-air drying furnace, by microwave, etc., thereby providing a ceramic honeycomb structure suffering no peeling and chipping in the peripheral wall. The present invention has been completed based on such finding.

Accordingly, the method of the present invention for producing a ceramic honeycomb structure comprising a ceramic honeycomb body having large numbers of longitudinal cells partitioned by porous cell walls, and a peripheral wall formed on a peripheral surface of the ceramic honeycomb body, comprises the steps of extruding a moldable ceramic material to form a honeycomb-structured ceramic green body;

machining a peripheral portion of the green body or a sintered body obtained from the green body to remove part of cell walls in the peripheral portion, thereby obtaining the ceramic honeycomb body having longitudinal grooves on the peripheral surface;

applying a coating material to the peripheral surface of the ceramic honeycomb body to form the peripheral wall, as well as to peripheral portions of both end surfaces of the ceramic honeycomb body; and inserting the coating material applied to the peripheral portions of both end surfaces into peripheral cells, such that the coating material remains on the peripheral portions.

It is preferable to remove the coating material remaining on the peripheral portions of both end surfaces after the coating material is dried.

The ceramic honeycomb structure of the present invention comprises a ceramic honeycomb body having large numbers of longitudinal cells partitioned by porous cell walls, a peripheral wall formed by coating material applied to a peripheral surface of the ceramic honeycomb body, and plugs formed by a coating material inserted into both end portions of cells in a peripheral portion of the ceramic honeycomb body.

DESCRIPTION OF THE PREFERRED EMBODIMENTS

[1] Ceramic Honeycomb Structure

Figure 1A:
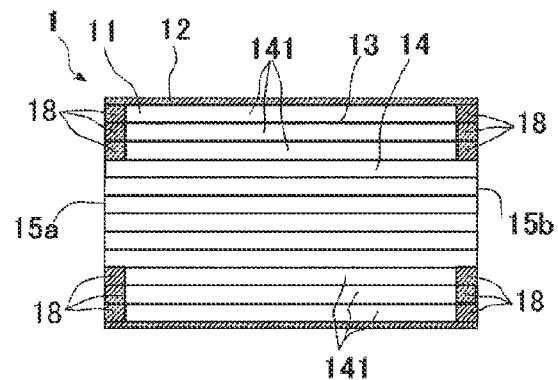
FIG. 1(a) is a schematic view showing a longitudinal cross section of one example of ceramic honeycomb structures produced by the method of the present invention.
Figure 1B:
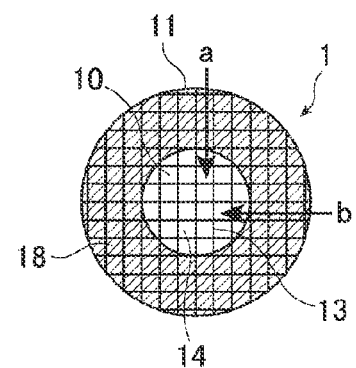
FIG. 1(b) is a schematic transverse view showing the ceramic honeycomb structure of FIG. 1(a).

As shown in FIGS. 1(a) and 1(b), the ceramic honeycomb structure 1 of the present invention comprises a ceramic honeycomb body 11 having large numbers of longitudinal cells 14 formed by porous cell walls 13, a peripheral wall 12 formed on a peripheral surface of the ceramic honeycomb body 11, and plugs 18 formed on both end surfaces 15a, 15b of peripheral cells 141 of the ceramic honeycomb body 11.

Among cells 14 (not including grooves 16 on a peripheral surface 11a) constituting the ceramic honeycomb body 11, the peripheral cells 141 are 1 to 7 cells arranged radially from the peripheral surface toward a center axis (the figure exemplifies 1-3 sealed cells). An exhaust gas does not flow through the peripheral cells 141 because they are provided with the plugs 18 at both ends. To prevent large pressure loss, the number of the peripheral cells 141 provided with the plugs 18 is preferably as small as possible. From such aspect, the peripheral cells 141 provided with the plugs 18 at both ends are arranged from the peripheral surface toward the center axis, preferably in a range from 1 to 5 cells, more preferably in a range from 1 to 4 cells, most preferably in a range from 1 to 2 cells. In the production method of the present invention described later, to prevent the peeling of the coating material 170 applied to the peripheral surface 11a, which occurs by heat shock during drying, the coating material is applied at least preferably in a range from 1 to 2 cells, more preferably in a range from 1 to 4 cells, from the peripheral surface toward the center axis. The number of cells provided with the plugs 18 and the number of cells coated with the coating material, except for grooves on the peripheral surface, are counted from the peripheral surface toward the center axis in a direction perpendicular to the periphery, which is shown by the arrow a or b in FIG. 1(b).

Figure 7A:
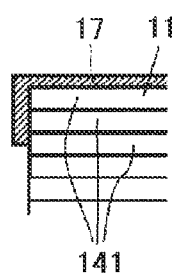
FIG. 7(a) is a partial cross-sectional view schematically showing a coating material applied to peripheral portions of end surfaces of a ceramic honeycomb body.
Figure 7B:
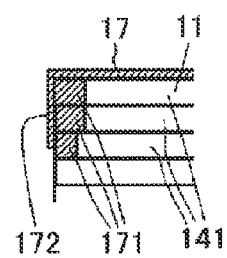
FIG. 7(b) is a partial cross-sectional view showing a coating material applied to peripheral portions of end surfaces of the ceramic honeycomb body of FIG. 7(a), which is inserted into cells with partially remaining on the peripheral portions.
Figure 7C:
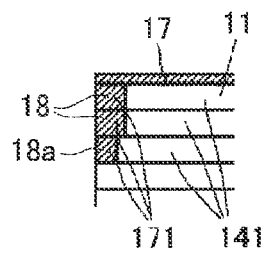
FIG. 7(c) is a partial cross-sectional view showing a coating material applied to peripheral portions of end surfaces of the ceramic honeycomb body of FIG. 7(a), which is inserted into cells without remaining on the peripheral portions.

The plugs 18 extend in both end portions of the peripheral cells 141 from each end surface of the ceramic honeycomb body 11 in a length of preferably 3-15 mm, more preferably 5-10 mm. All peripheral cells 141 need not have plugs 18 with the same length, but for example, plugs 18, 18a having different lengths may exist as shown in FIG. 7(c).

Figure 6:
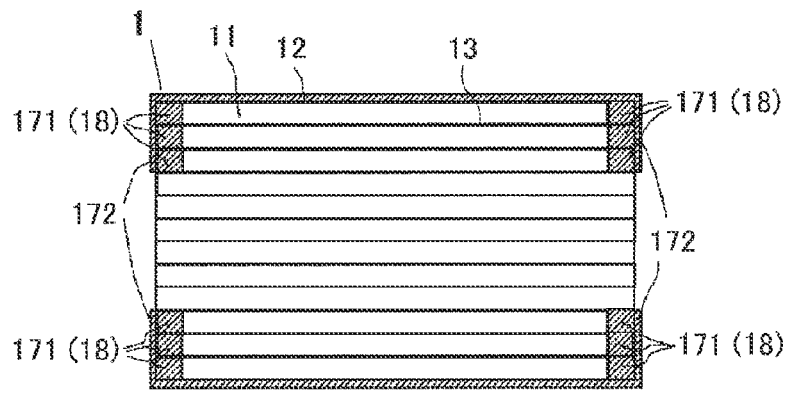
FIG. 6 is a schematic cross-sectional view showing a coating material left on peripheral portions of end surfaces after it is inserted into peripheral cells of a ceramic honeycomb body.

As shown in FIG. 6, part of the plugs 18 may project from the end surfaces of the peripheral cells 141, to form a coating material layer 172, by which not only adjacent plugs 18 are connected, but also the plugs 18 and the peripheral wall 12 are connected.

[2] Production Method of Ceramic Honeycomb Structure

The embodiments of the present invention will be explained below specifically referring to the drawings, without intention of restricting the present invention thereto. Within a range not deviating from the scope of the present invention, any modifications, improvements, etc. may be made to the embodiments properly based on the usual knowledge of those skilled in the art.

The method of the present invention for producing a ceramic honeycomb structure comprising a ceramic honeycomb body having large numbers of longitudinal cells partitioned by porous cell walls, and a peripheral wall formed on a peripheral surface of the ceramic honeycomb body, comprising the steps of (a) extruding a moldable ceramic material to form a honeycomb-structured ceramic green body;
(b) machining a peripheral portion of the green body or a sintered body obtained from the green body to remove part of cell walls in the peripheral portion, thereby obtaining a ceramic honeycomb body having longitudinal grooves on the peripheral surface;
(c) applying a coating material to a peripheral surface of the ceramic honeycomb body to form a peripheral wall; and
(d) applying a coating material to peripheral portions of both end surfaces of the ceramic honeycomb body, such that the coating material is inserted into peripheral cells, with part of the coating material remaining on peripheral portions of both end surfaces.

(a) Formation of Green Body

The honeycomb-structured ceramic green body is produced by extruding a moldable ceramic material. Ceramic powder is fully dry-mixed with a binder, a lubricant, and if necessary, a pore-forming material, and sufficiently blended with water to form a plasticized ceramic material. This ceramic material is extruded, cut to a predetermined length, and dried to obtain a honeycomb-structured ceramic green body integrally comprising a peripheral wall and cell walls.

(b) Production of Ceramic Honeycomb Body

Figure 2A:
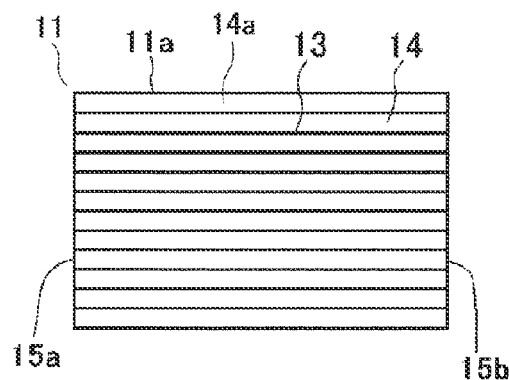
FIG. 2(a) is a schematic view showing a longitudinal cross section of one example of the ceramic honeycomb body bodies.
Figure 2B:
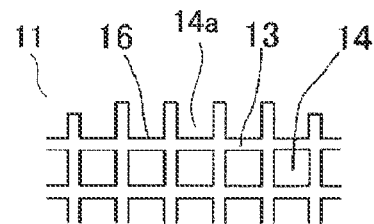
FIG. 2(b) is an enlarged schematic transverse view showing a peripheral portion of the ceramic honeycomb body of FIG. 2(a).

The honeycomb-structured ceramic green body is sintered, and a peripheral portion of the resultant sintered body is machined to remove part of cell walls of peripheral cells 14a in the peripheral portion as shown in FIGS. 2(a) and 2(b), thereby forming a ceramic honeycomb body 11 having longitudinal grooves 16 on a peripheral surface 11a. In this example, a peripheral surface is machined after the green body is sintered, but the green body before sintering may be machined and then sintered to form the ceramic honeycomb body 11.

Materials preferable for the ceramic honeycomb body include cordierite, alumina, silica, silicon nitride, silicon carbide, aluminum titanate, LAS, etc. Among them, a ceramic honeycomb body comprising cordierite as a main crystal phase is most preferable because it is inexpensive and has excellent heat resistance and chemical stability.

(c) Application of Coating Material

The ceramic honeycomb body 11 is coated with a coating material 17, on a peripheral surface 11a having longitudinal grooves 16, and on peripheral portions 151 of both end surfaces 15a, 15b. To prevent the peeling of the coating material 170 from the peripheral surface 11a due to heat shock during drying, the coating material is at least applied preferably in a range from 1 to 2 cells, more preferably in a range from 1 to 4 cells, from the peripheral surface toward the center axis. The thickness of the coating material 17 applied to the peripheral surface 11a is preferably 0.1-5 mm, more preferably 0.5-4 mm. The thickness of the coating material 17 applied to the peripheral portions 151 of both end surfaces 15a, 15b is preferably 3.5-15 mm, more preferably 4-13 mm.

Figure 3A:
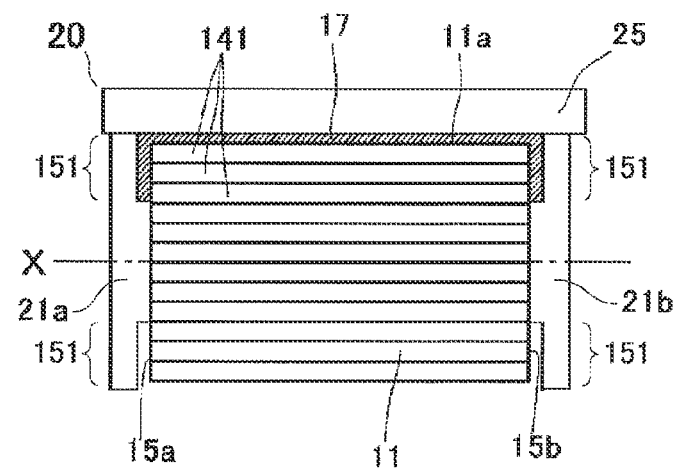
FIG. 3(a) is a schematic, longitudinal cross-sectional view showing an apparatus for applying a coating material to a peripheral surface and peripheral portions of end surfaces of a ceramic honeycomb body.

The coating material 17 can be applied, for example, by an applicator 20 shown in FIG. 3(a). The applicator 20 comprises two disc-shaped support plates 21a, 21b sandwiching both end surfaces 15a, 15b of the ceramic honeycomb body 11, and a scraper 25 abutting the peripheral ends 213a of the support plates 21a, 21b. The ceramic honeycomb body 11 sandwiched by the support plates 21a, 21b can freely rotate around a center axis X.

Figure 3B:
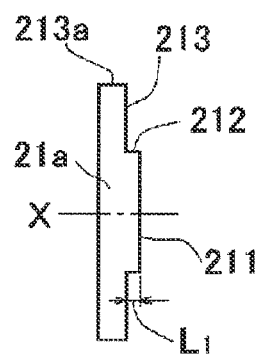
FIG. 3(b) is a schematic cross-sectional view showing a support plate in the apparatus of FIG. 3(a).
Figure 3C:
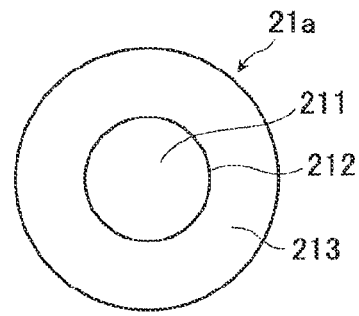
FIG. 3(c) is a schematic transverse view showing a support plate in the apparatus of FIG. 3(a).

As shown in FIGS. 3(a) and 3(b), each support plate 21a, 21b comprises a center portion 211 coming into contact with each end surface 15a, 15b of the ceramic honeycomb body 11, and a peripheral portion 213 thinner than the center portion 211, a boundary between the center portion 211 and the peripheral portion 213 constituting a step 212 having a height $L_1$, which is circular around the center axis. With such shape, a gap having a width $L_1$ for applying a coating material is provided between the peripheral portion 213 of each support plate 21a, 21b and each end surface 15a, 15b of the ceramic honeycomb body 11. Each support plate 21a, 21b has a larger outer diameter than that of the ceramic honeycomb body 11, providing a gap for applying a coating material between the peripheral surface 11a of the ceramic honeycomb body 11 and the scraper 25 abutting the peripheral end portions 213a of the support plates 21a, 21b.

With the ceramic honeycomb body 11 sandwiched by the support plates 21a, 21b, and with the scraper 25 abutting the peripheral end portions 213a of the support plates 21a, 21b, the coating material 17 is caused to flow into a gap between the peripheral surface 11a of the ceramic honeycomb body 11 and the scraper 25, and a gap between the peripheral portion 151 of each end surface 15a, 15b and the peripheral portion 213 of each support plate 21a, 21b. When the ceramic honeycomb body 11 sandwiched by the support plates 21a, 21b is rotated around the axis X, the coating material 17 made flat by the scraper 25 is applied to the peripheral surface 11a and the peripheral portion 151 of each end surface 15a, 15b. By this operation, the grooves 16 on the peripheral surface 11a are preferably filled with the coating material 17 without void.

With the outer diameters of the center portions 211 of the support plates 21a, 21b adjusted, the peripheral portions 151 of both end surfaces 15a, 15b of the ceramic honeycomb body 11, to which the coating material 17 is applied, can be controlled. Also, with the height $L_1$ of the steps 212 of the support plates 21a, 21b adjusted, the amount of the coating material 17 inserted into end portions of the peripheral cells 141 can be controlled, thereby adjusting the length of the plugs 18.

The coating material 17 is preferably in the form of a paste having a viscosity of 20 Pa·s or more, which is obtained by blending ceramic aggregate, colloidal silica or colloidal alumina, a binder, water, and if necessary, a dispersant, etc. Too high viscosity is not preferable, because a sufficient coating material 17 cannot be easily filled into the grooves 16 on the peripheral surface 11a of the ceramic honeycomb body 11, and because the coating material 17 applied to the peripheral portions 151 of end surfaces 15a, 15b cannot be easily filled into end portions of the peripheral cells 141. The viscosity of the coating material 17 is more preferably 500 Pa·s or less.

The ceramic aggregate may be cordierite, alumina, mullite, silica, aluminum titanate, etc. The ceramic aggregate may be the same as or different from the material of the ceramic honeycomb body. For example, the use of a material such as amorphous silica, etc. having a smaller thermal expansion coefficient than that of the ceramic honeycomb body provides good heat shock resistance. The coating material 17 may contain ceramic fibers, an inorganic binder, an organic binder, etc., in addition to ceramic aggregate.

Figure 4A:
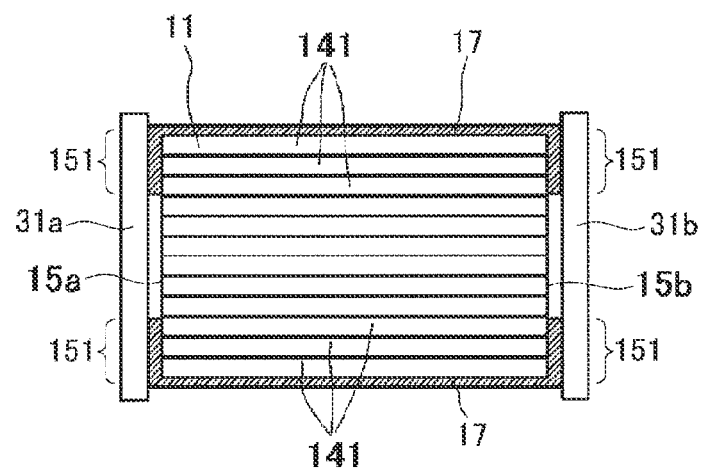
FIG. 4(a) is a schematic, longitudinal cross-sectional view showing a coating material, which is to be inserted into cells in peripheral portions of end surfaces of a ceramic honeycomb body.
Figure 4B:
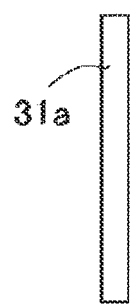
FIG. 4(b) is a schematic cross-sectional view showing the pressing jig of FIG. 4(a).

After the coating material 17 is applied, the scraper 25 and the support plates 21a, 21b are taken out of the ceramic honeycomb body 11, and the ceramic honeycomb body 11 having the coating material 17 in grooves 16 on the peripheral surface 11a and on the peripheral portions 151 of the end surfaces 15a, 15b is separated from the applicator 20. As shown in FIG. 4(a), disc-shaped pressing jigs 31a, 31b [FIG. 4(b)] are pressed onto the coating material 17 on the peripheral portions 151 of the end surfaces 15a, 15b of the separated ceramic honeycomb body 11, so that the coating material 17 enters the end portions of the peripheral cells 141. As a result, as shown in FIG. 6, the coating material 171 entering the end portions of the peripheral cells 141 forms plugs 18 in both end portions of the peripheral cells 141, resulting in a residual coating material layer 172 on the peripheral portions 151 of the end surfaces 15a, 15b of the ceramic honeycomb body 11.

The coating material 171 inserted into the end portions of the peripheral cells 141 fill end portions of the cells, and enter pores in the porous cell walls 13, resulting in high adhesion to the cell walls 13. Accordingly, the coating material 170 applied to grooves 16 on the peripheral surface 11a to form a peripheral wall 12, the residual coating material layer 172, the coating material 171 inserted into the cell end portions to form plugs 18, and the cell walls 13 are well adhered integrally to the ceramic honeycomb body 11. With the pressing jigs 31a, 31b designed to stop at predetermined positions from both end surfaces 15a, 15b of the ceramic honeycomb body 11, the length of the coating material 171 inserted into the end portions of the peripheral cells 141, and the thickness of the residual coating material layer 172 can be controlled.

Figure 5A:
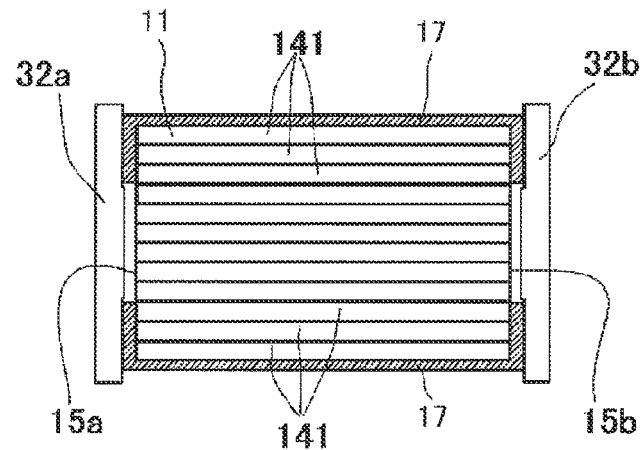
FIG. 5(a) is a schematic, longitudinal cross-sectional view showing a coating material, which is to be inserted into peripheral cells of a ceramic honeycomb body.
Figure 5B:
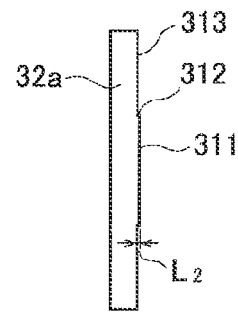
FIG. 5(b) is a schematic cross-sectional view showing the pressing jig of FIG. 5(a).
Figure 5C:
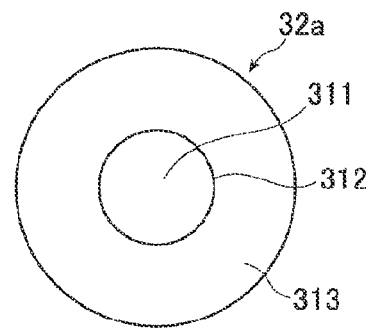
FIG. 5(c) is a schematic transverse view showing the pressing jig of FIG. 5(a).

The thickness of the residual coating material layer 172 can be easily controlled, for example, by using disc-shaped pressing jigs 32a, 32b having a step 312 between a center portion 311 and a peripheral portion 313 as shown in FIGS. 5(a) to 5(c). The stepped, disc-shaped pressing jigs 32a, 32b are pressed to both end surfaces 15a, 15b of the ceramic honeycomb body 11 under a load of 0.1 MPa or more, until the end surfaces of the center portion 311 come into contact with the end surfaces 15a, 15b of the ceramic honeycomb body 11, as shown in FIG. 5(a), so that the coating material 17 applied to the peripheral portions 151 of the end surfaces 15a, 15b is inserted into the cells, thereby forming the plugs 18 and the residual coating material layer 172. In this case, the height $L_2$ of the step 312 of the stepped, disc-shaped pressing jigs 32a, 32b may be changed to adjust the thickness of the residual coating material layer 172.

After the coating material 17 applied to the peripheral portions 151 of the end surfaces 15a, 15b of the ceramic honeycomb body 11 is inserted into the cells, the pressing jigs 31a, 31b (or the stepped, disc-shaped pressing jigs 32a, 32b) are removed, and the coating material 17 is dried by a known method such as hot air drying, microwave drying, etc. to remove moisture from the coating material 17, thereby forming a peripheral wall 12 on the grooves 16 on the peripheral surface 11a, and plugs 18 in both end portions of the peripheral cells 141. In the production method of the ceramic honeycomb structure 1 according to the present invention, the coating material 171 in both end portions of the peripheral cells 141 intrude into pores in the cell walls 13, so that the coating material 170 applied to the grooves 16 on the peripheral surface 11a, the residual coating material layer 172, the coating material 171 in the cell end portions, and the cell walls 13 are integrally well adhered. Accordingly, even with heat shock in drying the ceramic honeycomb body 11 coated with the coating material 17, gaps would not easily be formed between the coating material 17 and the cell walls 13 in the end portions of the peripheral wall 12, so that the end portions of the peripheral wall 12 would not be peeled or damaged in subsequent handling and use in a metal container.

To achieve good adhesion of the coating material 171 in both end portions of the peripheral cells 141 to the cell walls 13, the coating material 17 is inserted to a depth of preferably 3 mm or more, more preferably 5 mm or more.

When the residual coating material layer 172 formed by the coating material 17 remaining on the peripheral portions 151 of the end surfaces 15a, 15b of the ceramic honeycomb body 11 is less than 0.5 mm in thickness, the coating material 170 applied to the grooves 16 on the peripheral surface 11a, the residual coating material layer 172, the coating material 171 in the cell end portions, and the cell walls 13 are not sufficiently integrated, likely resulting in gaps between the peripheral wall 12 and the grooves 13 while drying the coating material 17. Therefore, the thickness of the residual coating material layer 172 is preferably 0.5 mm or more, more preferably 1 mm or more. When the residual coating material layer 172 is as thick as more than 10 mm, the residual coating material layer 172 is easily broken in subsequent handling, likely acting as a breakage-starting site of the coating material 170 (peripheral wall 12) applied to the peripheral surface 11a. The thickness of the residual coating material layer 172 is preferably 8 mm or less, more preferably 5 mm or less.

In order that the coating material 170 applied to the grooves 16 on the peripheral surface 11a, the residual coating material layer 172 and the coating material 171 in the cell end portions are well adhered integrally to the cell walls 13, the cell walls 13 preferably have porosity of 40-80%.

After drying, the residual coating material layer 172 on the peripheral portions 151 of the end surfaces 15a, 15b are projecting from both end surfaces 15a, 15b of the ceramic honeycomb body 11. Accordingly, they may be removed by grinding after drying, to form the ceramic honeycomb structure 1 shown in FIGS. 1(a) and 1(b). When the residual coating material layer 172 is removed after drying, gaps are unlikely to generate between the end portions of the peripheral wall 12 and the grooves 13, because the coating material 17 is already dried.

The coating material 171 need not have the same depth in the end portions of the peripheral cells 141. When a radially inward portion of the coating material 17 applied to the peripheral portion 151 of each end surface 15a, 15b does not cover a cell completely as shown in FIG. 7(a), the coating material 171 inserted into the end portions of the peripheral cells 141 does not the same depth as shown in FIGS. 7(b) and 7(c). In such case, the effects of the present invention are obtained.

Figure 11A:
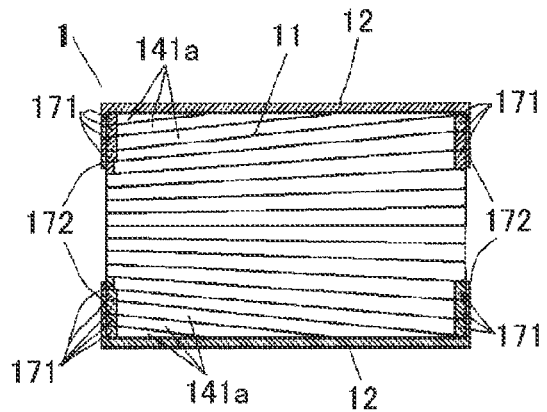
FIG. 11(a) is a schematic cross-sectional view showing the ceramic honeycomb body of Example 8, in which a coating material remains on peripheral portions of end surfaces.
Figure 11B:
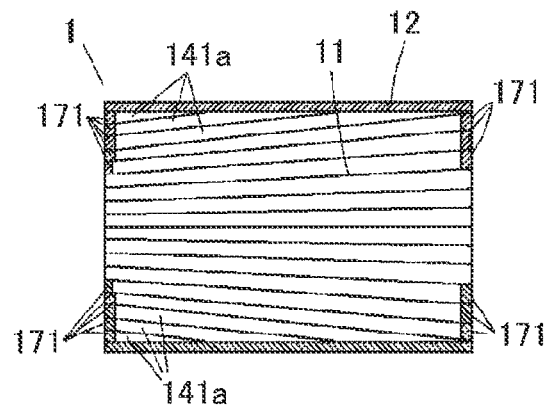
FIG. 11(b) is a schematic cross-sectional view showing a ceramic honeycomb structure obtained by removing the remaining coating material by grinding in Example 8.
Figure 12A:
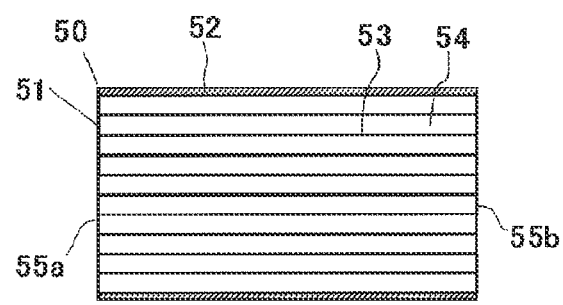
FIG. 12(a) is a schematic view showing a longitudinal cross section of an example of conventional ceramic honeycomb structures.
Figure 12B:
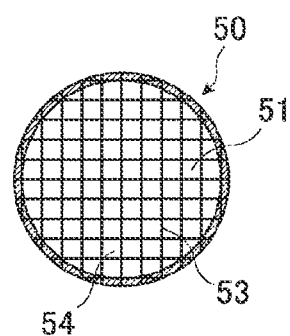
FIG. 12(b) is a schematic transverse view showing the ceramic honeycomb structure of FIG. 12(a).
Figure 13A:
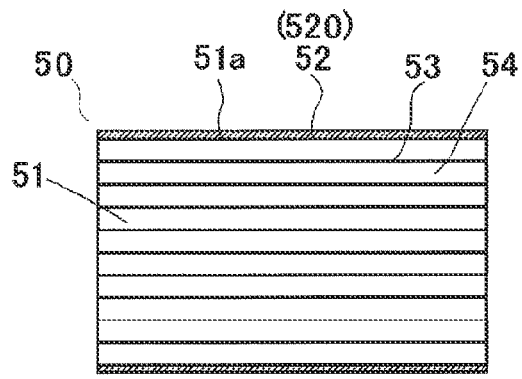
FIG. 13(a) is a schematic cross-sectional view showing a longitudinal cross section of the ceramic honeycomb structure described in JP 05-269388 A.
Figure 13B:
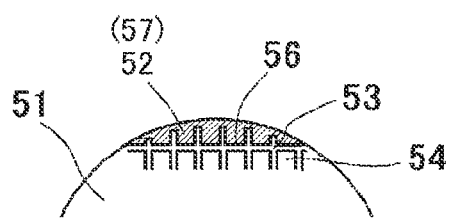
FIG. 13(b) is an enlarged schematic transverse view showing a peripheral portion of the ceramic honeycomb structure of FIG. 13(a).

When the method of the present invention is used to produce a ceramic honeycomb structure 1 having cells 141a each having one end sealed by a peripheral wall 12 as shown in FIGS. 11(a) and 11(b), the peeling and chipping of the end portions of the peripheral wall 12 can be prevented, and the sealed cells 141a provide higher heat insulation because the cells 141a are sealed by the coating material 171 at the other ends.

After drying, if necessary, the peripheral wall 12 may be heated and sintered. Both ends of each cell in the ceramic honeycomb structure 1 may be alternately plugged.

[3] Examples

The present invention will be explained in more detail referring to Examples below without intention of restricting the present invention thereto.

Example 1

(1) Production of Ceramic Honeycomb Body

Kaolin powder, talc powder, silica powder, and alumina powder were mixed to prepare a cordierite-forming material powder comprising 50% by mass of $SiO_2$, 36% by mass of $Al_2O_3$, and 14% by mass of MgO. This material powder was fully dry-mixed with methylcellulose and hydroxypropyl methylcellulose as a binder, a lubricant, and a foamed resin as a pore-forming material, and sufficiently blended with water to prepare a plasticized ceramic material. This ceramic material was extruded, cut to a predetermined length, and dried to obtain a honeycomb-structured ceramic green body comprising a peripheral portion integral with cell walls. This green body was sintered, and then machined to remove part of cell walls existing in a peripheral portion, thereby obtaining a cordierite honeycomb body with longitudinal grooves on a peripheral surface, which had an outer diameter of 266 mm, a length of 305 mm, a cell wall thickness of 0.3 mm, a cell pitch of 1.57 mm, and a cell wall porosity of 61%.

(2) Preparation of Coating Material 100 parts by mass of cordierite powder having an average particle size of 50 μm was mixed with 13 parts by mass of colloidal silica on a solid basis, and 100 parts by mass in total of the cordierite powder and the colloidal silica were mixed with 1.2 parts by mass of methylcellulose on a solid basis. The resultant mixture was blended with water to prepare a coating material 17 having viscosity of 20 Pa·s.

(3) Application of Coating Material

Figure 9A:
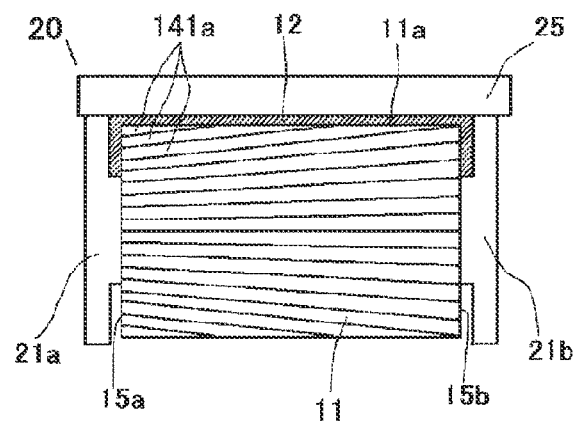
FIG. 9(a) is a schematic cross-sectional view showing an apparatus for applying a coating material to a peripheral surface and peripheral portions of end surfaces of the ceramic honeycomb body of Example 8.
Figure 9B:
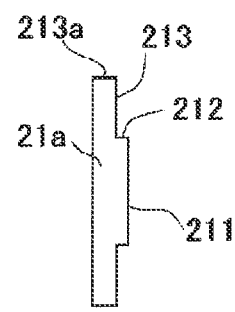
FIG. 9(b) is a schematic cross-sectional view showing a support plate in the apparatus of FIG. 9(a).

Using the applicator 20 shown in FIGS. 9(a) and 9(b), the coating material 17 was applied to a peripheral surface 11a of the ceramic honeycomb body. The applicator 20 comprised support plates 21a, 21b of 270 mm in outer diameter with a step 212 having a height $L_1$ of 6 mm. The distance from the step 212 to a periphery 213a was set, such that a coating material applied to a peripheral portion of each end surface 15a, 15b of the ceramic honeycomb body covers 5 cells (excluding grooves on the peripheral surface) from the periphery toward the center axis.

While a ceramic honeycomb body 11 sandwiched by the support plates 21a, 21b on both end surfaces 15a, 15b was rotated, with a scraper 25 abutting the peripheral ends 213a of the support plates 21a, 21b, the coating material 17 was applied, and introduced into a gap between the peripheral surface 11a of the ceramic honeycomb body 11 and the scraper 25, and a gap between the peripheral portion 151 of each end surface 15a, 15b and each support plate 21a, 21b, and flattened by the scraper 25.

After application, the support plates 21a, 21b were removed, and disc-shaped pressing jigs 32a, 32b each having a step 312 having a height $L_2$ of 1 mm [see FIGS. 5(b) and 5(c)] were pressed onto both entire end surfaces of the ceramic honeycomb body 11 under a load of 0.1 MPa, to insert the coating material 17 applied to the peripheral portion 151 of each end surface 15a, 15b into cells, as shown in FIG. 5(a).

After the coating material 17 (peripheral wall 12) applied to the peripheral surface 11a, the coating material 171 (plugs 18) in the end portions of the peripheral cells 141, and the residual coating material layer 172 were dried at 130° C. for 2 hours in a hot-air drying furnace, the residual coating material layer 172 was removed by grinding from the peripheral portions 151 of the end surfaces 15a, 15b, thereby producing three ceramic honeycomb structures each having an outer diameter of 270 mm and a length of 305 mm.

With respect to the ceramic honeycomb structure 1 of Example 1, the presence of the coating material applied to peripheral portions of end surfaces, the number of cells covered by the coating material, the number of cells having the coating material inserted, the length of the coating material inserted, the thickness of the residual coating material layer 172 when dried, and the removal of the residual coating material layer 172 after drying are shown in Table 1. In Table 1, the number of cells covered by the coating material and the number of cells having the coating material inserted (excluding grooves on the peripheral surface) were counted from the peripheral surface toward the center axis in a direction perpendicular to the periphery, which is shown by the arrow a or b in FIG. 1(b). The length of the coating material inserted was measured at 10 sites in a sample cut after the evaluation test, and averaged.

With respect to these samples, the generation of gaps between the end portions of the peripheral wall and the peripheral surface, the breakage of samples vibrated after assembled in a metal container, and pressure loss were evaluated. The results are shown in Table 1.

With one of the ceramic honeycomb structures cut for observation by the naked eye, the generation of gaps between the end portions of the peripheral wall and the peripheral surface was evaluated by the following standard:

Excellent: No gap.
Good: With gap of less than 0.5 mm.
Fair: With gap of 0.5 mm or more and less than 1 mm.
Poor: With gap of 1 mm or more.

Another ceramic honeycomb structure assembled in a metal container was subject to a vibration test at 60 G and 100 Hz for 100 hours, and taken out of the metal container for observation by the naked eye. The breakage of the ceramic honeycomb structure in a metal container under vibration was evaluated by the following standard:

Excellent: No breakage.
Good: Suffering breakage of less than 0.5 mm from the end portion.
Fair: Suffering breakage of 0.5 mm or more and less than 1 mm.
Poor: Suffering breakage of 1 mm or more.

Air was blown through a further ceramic honeycomb structure fixed to a pressure loss test stand at a flow rate of 10 Nm³/min, to measure pressure difference (pressure loss) between the inlet side and the outlet side, thereby evaluating the pressure loss by the following standard:

Excellent: The pressure loss was 0.6 kPa or less.

Good: The pressure loss was more than 0.6 kPa and 0.8 kPa or less.

Fair: The pressure loss was more than 0.8 kPa and 1.0 kPa or less.

Poor: The pressure loss was more than 1.0 kPa.

Examples 2-5

A ceramic honeycomb structure 1 having an outer diameter of 270 mm and a length of 306 mm was produced in the same manner as in Example 1, except for changing the distance from the step 212 to the periphery 213a in each support plate 21a, 21b in the applicator 20 to change the number of cells covered by a coating material applied to the peripheral portions of both end surfaces of the ceramic honeycomb body 11 (the number of cells covered by the coating material) as shown in Table 1, and evaluated in the same manner as in Example 1. The results are shown in Table 1.

Example 6

A ceramic honeycomb structure 1 having an outer diameter of 270 mm and a length of 306 mm was produced in the same manner as in Example 1, except that pressing jigs 31a, 31b each having a step 312 having a height $L_2$ of 0.5 mm were used, and that the residual coating material layer 172 was not removed from the peripheral portions 151 of both end surfaces 15a, 15b, and evaluated in the same manner as in Example 1. The results are shown in Table 1.

Example 7

A ceramic honeycomb structure 1 was produced in the same manner as in Example 1, except that a pore-forming material was not used in the production of the ceramic honeycomb body 11, and that the ceramic honeycomb body 11 had a cell wall thickness of 0.2 mm, a cell pitch of 1.47 mm and a cell wall porosity of 35%, and evaluated in the same manner as in Example 1. The results are shown in Table 1.

Example 8

Figure 8A:
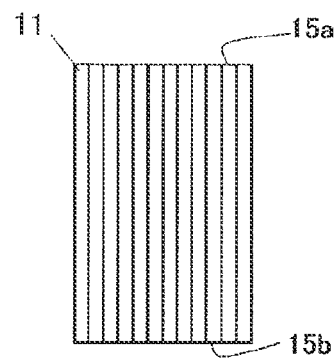
FIG. 8(a) is a schematic cross-sectional view showing the honeycomb-structured green body of Example 8.
Figure 8B:
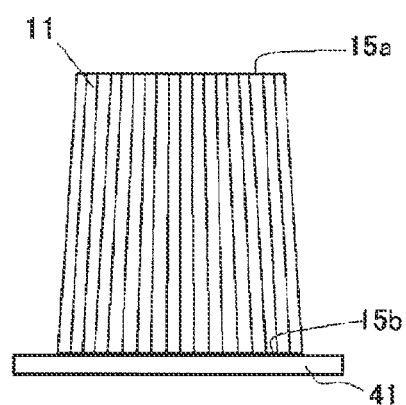
FIG. 8(b) is a schematic cross-sectional view showing the honeycomb-structured green body of Example 8, which is being dried.
Figure 8C:
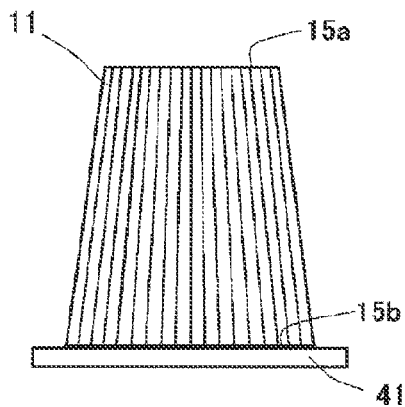
FIG. 8(c) is a schematic cross-sectional view showing the honeycomb-structured green body of Example 8, which is dried and then sintered.
Figure 8D:
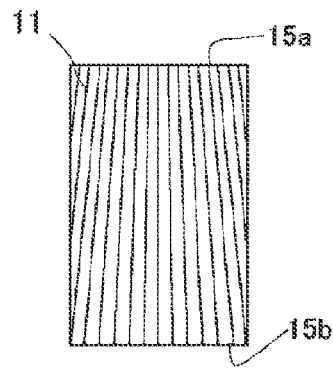
FIG. 8(d) is a schematic cross-sectional view showing a ceramic honeycomb body obtained by machining the honeycomb-structured green body of Example 8 to a cylindrical shape after sintering.

A honeycomb-structured ceramic green body [FIG. 8(a)] extruded in the same manner as in Example 1 was dried on a silicon nitride table 41 having surface roughness of 300 µm. Because the table 41 was not slidable due to high surface roughness, the ceramic honeycomb body 11 was subject to smaller drying shrinkage on the side of the end surface 15b in contact with the table 41 due to friction between the table 41 and the end surface 15b, resulting in a dried, frustoconical, honeycomb-structured ceramic green body having a larger outer diameter at the end surface 15b than at the end surface 15a [FIG. 8(b)]. This frustoconical, honeycomb-structured ceramic green body was sintered, with the end surface 15b having a larger outer diameter in contact with the table 41 [FIG. 8(c)]. The resultant frustoconical sintered body was cylindrically machined to remove a peripheral side portion, to obtain a cordierite honeycomb body having an outer diameter of 266 mm, a length of 305 mm, a cell wall thickness of 0.3 mm, a cell pitch of 1.57 mm, and a cell wall porosity of 61% [FIG. 8(d)]. In this ceramic honeycomb body, as shown in FIG. 8(d), three cells existing from the periphery of the end surface 15a toward the center axis were not penetrating to the end surface 15b on the other side, but open as longitudinal grooves on the peripheral surface.

Figure 10A:
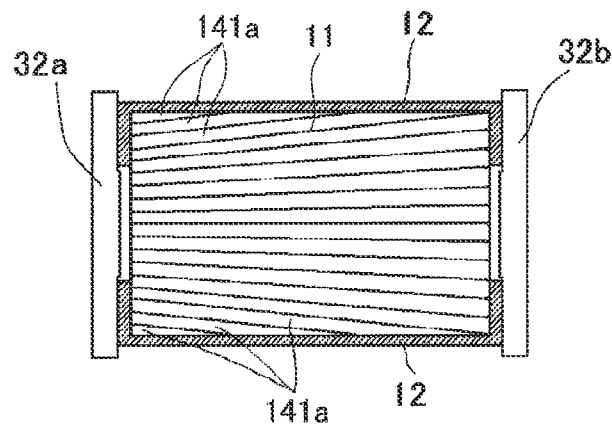
FIG. 10(a) is a schematic, longitudinal cross-sectional view showing a coating material, which is to be inserted into peripheral cells of the ceramic honeycomb body of Example 8.
Figure 10B:
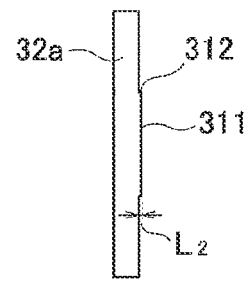
FIG. 10(b) is a schematic cross-sectional view showing the pressing jig of FIG. 10(a).

A coating material 17 was applied to this ceramic honeycomb body 11 in the same manner as in Example 1, and the coating material 17 applied to the peripheral portion 151 of each end surface 15a, 15b was inserted into the cells as shown in FIGS. 10(a) and 10(b). As shown in FIG. 11(a), drying was conducted with the residual coating material layer 172 remaining as in Example 1. After drying, the residual coating material layer 172 was removed from the end surfaces of the peripheral cells by grinding to produce a ceramic honeycomb structure 1 shown in FIG. 11(b), and evaluated in the same manner as in Example 1. The results are shown in Table 1. Because the number of cells covered with the coating material and the number of cells having the coating material inserted were different between two end surfaces, those on both end surfaces are shown in Table 1.

Example 9

A ceramic honeycomb structure 1 having an outer diameter of 270 mm and a length of 306 mm was produced in the same manner as in Example 3 except for using support plates 21a, 21b each having a step 212 having a height $L_1$ of 4 mm, and evaluated in the same manner as in Example 1. The results are shown in Table 1.

Comparative Example 1

A ceramic honeycomb structure 1 having an outer diameter of 270 mm and a length of 306 mm was produced in the same manner as in Example 1, except that a coating material 21 was not applied to the end surfaces 15a, 15b of the ceramic honeycomb body 11. Because the coating material 21 was not applied to the end surfaces 15a, 15b, the insertion of the coating material 17 into cells by the stepped, disc-shaped pressing jigs 32a, 32b, and the removal of the residual coating material layer 172 were not conducted.

Figure 14:
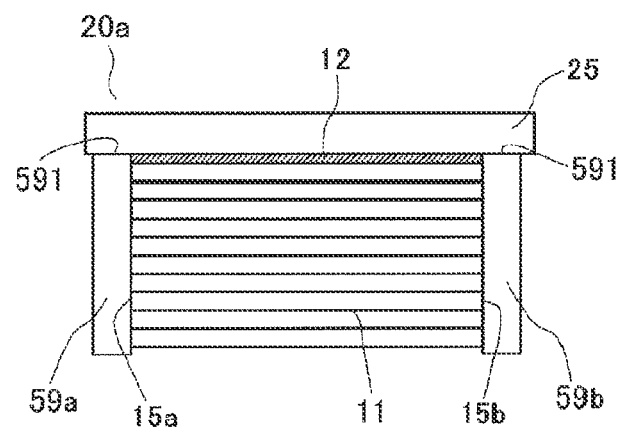
FIG. 14 is a schematic cross-sectional view showing an apparatus for applying a coating material to a peripheral surface of the ceramic honeycomb body of Comparative Example 1.
Figure 15A:
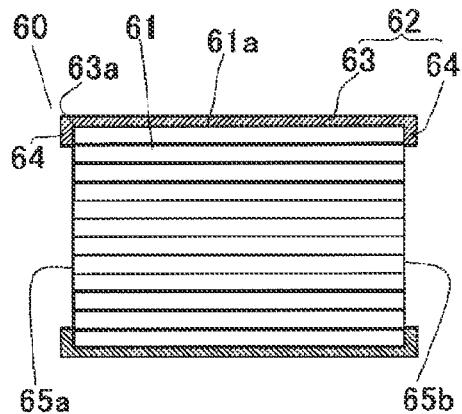
FIG. 15(a) is a schematic cross-sectional view showing the ceramic honeycomb structure described in WO 07/148764 A.
Figure 15B:
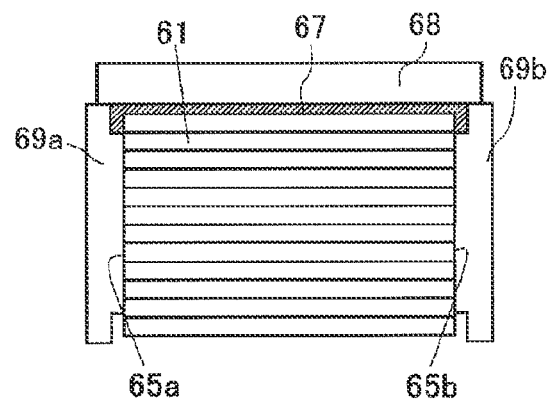
FIG. 15(b) is a schematic cross-sectional view showing an apparatus for producing the ceramic honeycomb structure described in WO 07/148764 A.
Figure 16A:
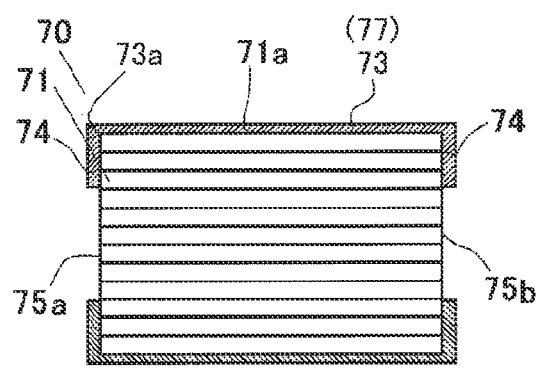
FIG. 16(a) is a schematic cross-sectional view showing an example of the ceramic honeycomb structures described in WO 08/117729 A.
Figure 16B:
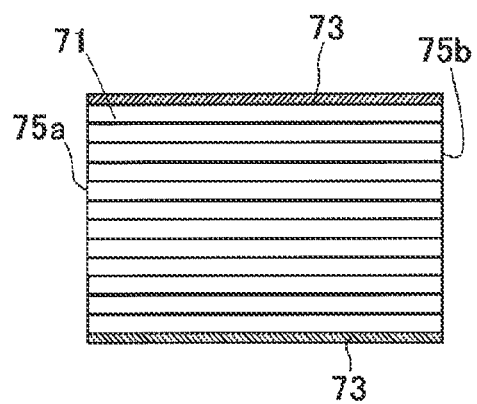
FIG. 16(b) is a schematic cross-sectional view showing another example of the ceramic honeycomb structures described in WO 08/117729 A.
Figure 17:
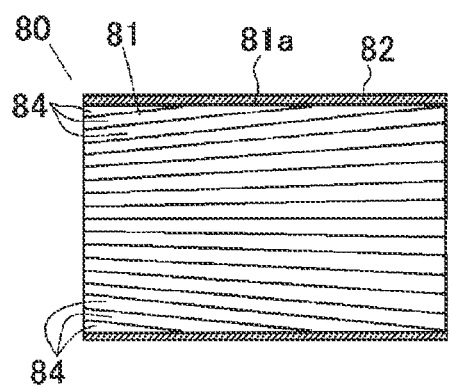
FIG. 17 is a schematic cross-sectional view showing the ceramic honeycomb structure described in JP 2003-284923 A.

The coating material 17 was applied to the peripheral surface 11a of the ceramic honeycomb body 11, using the applicator 20a shown in FIG. 14. This applicator 20a comprised support plates 59a, 59b each having no step 212, in place of support plates 21a, 21b used in Example 1. Namely, each support plate 59a, 59b has a shape abutting an entire surface of each end surface 15a, 15b of the ceramic honeycomb body 11, with an outer diameter of 270 mm, the same as the outer diameter of each support plate 21a, 21b in the applicator 20 used in Example 1.

The resultant ceramic honeycomb structure 1 was evaluated in the same manner as in Example 1. The results are shown in Table 1.

Comparative Example 2

A ceramic honeycomb structure 1 having an outer diameter of 270 mm and a length of 306 mm was produced in the same manner as in Example 1, except that an operation for inserting a coating material 17 applied to the peripheral portion 151 of each end surface 15a, 15b into cells was not conducted, and evaluated in the same manner as in Example 1. The results are shown in Table 1. The coating material 17 applied to the end surfaces of the peripheral cells 141 and dried was removed by grinding, like the residual coating material layer 172 in Example 1.

TABLE 1

Application of Coating Material to Peripheral Portions of End Surfaces

| No. | Yes or No | Number of Cells Covered With Coating Material* | Number of Cells Having Coating Material Inserted* |
|---|---|---|---|
| Example 1 | Yes | 5 | 5 |
| Example 2 | Yes | 7 | 7 |
| Example 3 | Yes | 3 | 3 |
| Example 4 | Yes | 1 | 1 |
| Example 5 | Yes | 9 | 9 |
| Example 6 | Yes | 5 | 5 |
| Example 7 | Yes | 5 | 5 |
| Example 8 | Yes | 4 (3)*[2] | 4 (3)*[2] |
| Example 9 | Yes | 3 | 3 |
| Com. Ex. 1 | No | 0 | 0 |
| Com. Ex. 2 | Yes | 5 | 0 |

Note:
*The number of cells counted from the peripheral surface toward the center axis (excluding grooves on the peripheral surface).
*[2]The number in the parenthesis is the number of cells at an end surface on the other side.

Application of Coating Material to Peripheral Portions of End Surfaces

| No. | Length of Coating Material Inserted (mm) | Thickness of Residual Coating Material Layer* (mm) | Removal of Residual Coating Material Layer |
|---|---|---|---|
| Example 1 | 5 | 1 | Removed |
| Example 2 | 5 | 1 | Removed |
| Example 3 | 5 | 1 | Removed |
| Example 4 | 5 | 1 | Removed |
| Example 5 | 5 | 1 | Removed |
| Example 6 | 5.5 | 0.5 | Not Removed |
| Example 7 | 5 | 1 | Removed |
| Example 8 | 5 | 1 | Removed |
| Example 9 | 3 | 1 | Removed |
| Com. Ex. 1 | — | — | — |
| Com. Ex. 2 | — | 6 | Removed |

Note:
*Thickness of a coating material layer remaining when dried.

Evaluation Results

| No. | Gaps in End Portions of Peripheral Wall | Breakage During Use | Pressure Loss |
|---|---|---|---|
| Example 1 | Good | Good | Good |
| Example 2 | Good | Good | Fair |
| Example 3 | Excellent | Excellent | Excellent |
| Example 4 | Fair | Fair | Excellent |
| Example 5 | Good | Good | Fair |
| Example 6 | Fair | Fair | Good |
| Example 7 | Good | Good | Good |
| Example 8 | Good | Good | Good |
| Example 9 | Good | Good | Excellent |
| Com. Ex. 1 | Poor | Poor | Excellent |
| Com. Ex. 2 | Poor | Poor | Excellent |

It is clear from Table 1 that each ceramic honeycomb structure of Examples 1-9 produced by inserting a coating material applied to the peripheral portions of both end surfaces of the ceramic honeycomb body into cells, and drying it with the residual coating material layer on the peripheral portions of both end surfaces unlikely has gaps between the peripheral wall and the peripheral surface, suffering little peeling and chipping by vibration during use in end portions of the peripheral wall. This appears to be due to the fact that the coating material applied to the peripheral surface (grooves defined by cell walls) is integrally and firmly adhered to the coating material inserted into cells and the residual coating material layer on end surfaces.

On the other hand, the ceramic honeycomb structure of Comparative Example 1, in which a coating material was not applied to peripheral portions of both end surfaces of the ceramic honeycomb body, suffers gaps between end portions of the peripheral wall and the peripheral surface, with much peeling and chipping on the peripheral wall. In Comparative Example 2, in which a coating material was applied to peripheral portions of both end surfaces of the ceramic honeycomb body, but not inserted into cells, the coating material is not sufficiently adhered to both end surfaces of the ceramic honeycomb body, resulting in gaps between end portions of the peripheral wall and the peripheral surface, with much peeling and chipping on the peripheral wall.

Effects of the Invention

In the formation of a peripheral wall on a ceramic honeycomb body having longitudinal grooves on a peripheral surface, when a coating material is applied not only to a peripheral surface of the ceramic honeycomb body, but also to peripheral portions of both end surfaces of the ceramic honeycomb body, with a coating material on both end surfaces inserted into cells, gaps are unlikely generated between the peripheral wall and the grooves when dried, resulting in a ceramic honeycomb structure not suffering peeling and chipping from the gap in end portions of the peripheral wall in subsequent handling and use in a metal container, and free from damage from this defect in the peripheral wall.

What is claimed is:

1. A method for producing a ceramic honeycomb structure comprising a ceramic honeycomb body having a plurality of longitudinal cells partitioned by porous cell walls, and a peripheral wall formed on a peripheral surface of said ceramic honeycomb body, comprising the steps of extruding a moldable ceramic material to form a ceramic green body having a honeycomb structure;

machining a peripheral portion of said green body or a sintered body obtained from said green body to remove part of cell walls in the peripheral portion, thereby obtaining said ceramic honeycomb body having longitudinal grooves on the peripheral surface;

applying a coating material to the peripheral surface of said ceramic honeycomb body to form said peripheral wall, as well as to peripheral portions of both end surfaces of said ceramic honeycomb body, by an applicator comprising (i) two disc-shaped support plates sandwiching both end surfaces of the ceramic honeycomb body and (ii) a scraper abutting peripheral ends of the support plates, wherein each support plate comprises (A) a center portion coming into contact with an end surface of the ceramic honeycomb body and (B) a peripheral portion thinner than the center portion to provide a gap for the applying of the coating material; and inserting the coating material applied to said peripheral portions of both end surfaces into peripheral cells, with part of the coating material remaining on the peripheral portion.

* * * * *